9726X
J. C. Channel,
Mortising Machine.
Patented June 16, 1836.
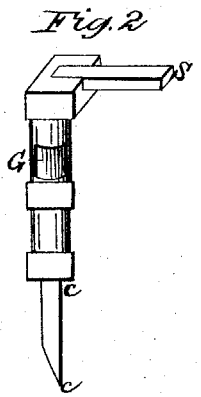
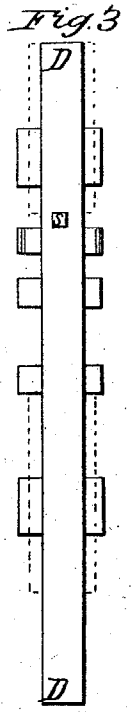
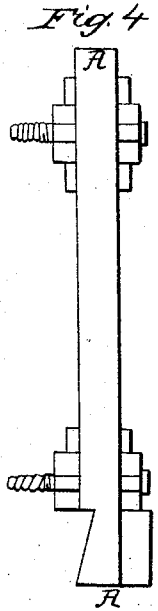
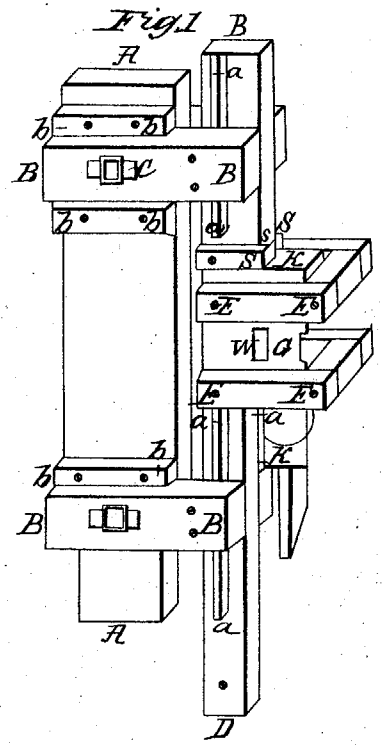
AM. PHOTO-LITHO. CO. N.Y. (OSBORNE'S PROCESS)

June 16. 1836 9726X 23[illegible]

James C. Channel, of Dunstable, N. Hampshire.
Letters Patent

The schedule referred to in these Letters Patent, and making a part of the same containing a description in the words of the said James C. Channel himself of his improvement in the portable mortising machine. –

To all to whom these presents shall come: Be it known that I, James C. Channel of Dunstable in the County of Hillsborough, and State of New-Hampshire, have invented a new and useful improvement in the portable mortising machine, and that the following is a full and exact description of the construction & operation of the said machine as invented or improved by me, by a reference to the drawings. Fig. I. represents the machine in a working position. A.A. is the main post which is fastened into a bench at the bottom by a key or otherwise, and stands perpendicular to this main post, the other parts are fastened. B.B. are arms extending from the main post, to receive the moveable parts of the machine, and are supported by the stays bb. there are four of them, two only of which are shown in the drawings. These arms are confined to the main post at cc by bolts which play in mortises in the arms & fastened by nuts: by means of which the arms may be moved forward or back to accommodate the shoulder of the mortise to be made by machine. DD is a moveable shaft made to pass up and down freely through the arms by means of the slide pieces aa fitted to grooves in the arms BB. E.E. are also arms made fast to the shaft, being four, two shewn on the drawing. These are to support the chisel stock seen Fig. I, also at KK. in Fig. I. on each side of the chisel stock are gains cut into it one of which is seen at G. fig. I. there is also a gain let into the shaft DD fig. I seen at W. when the chisel stock is put into the arms E.E it is made fast by a wedge fitted into the said gains, seen at W. By raising the chisel stock so that the square parts will be above the arms, the stock may be turned (there being gains cut into the shaft for the square parts to turn in) so that the chisel will head the other way. in such case the circular parts of stock play in the arms. – S Fig. I is a stop, (there being another on the opposite side of 9234. 9726X the Shaft) - in the Shaft S is another Stop (seen also at fig. III) which may be taken out readily - these Stops are for the purpose of guiding the chisel Stock in changing the heading of the chisel - they come in contact with the Stop S fig II - The chisel I. fig II is fastened into the Stock by means of a Screw or any other convenient mode - Fig IV represents the front view of the main post A. A. Fig III represents front view of the Shaft DD. - The Shaft DD is thrown up by means of a spring made fast under the bench or otherwise & is thus worked with a treadle - Upon the side of the bench there is a rest which is confined by bolts & may be moved up or down at pleasure —

The Stuff to be mortised is placed upon the rest and the chisel is then worked sinking it deeper & deeper till the other end of the designed mortise is reached. The wedge is then taken out, the chisel headed the other way & the mortise is perfected. - The various parts of the machine may be of wood screwed together or of iron (the chisel is of any desired kind).

The drawings are nearly on a scale of [illegible] inch to an inch - The applicant claims no one part of the above machine as new, but the combination & arrangement of the various parts as above specified, and the application thereof, & of the powers and principles embraced in its construction & operation and the method above set forth, for the purpose of mortising as aforesaid. In witness whereof I have hereunto set my hand this twenty second day of January (in the presence of witnesses who as such hereunto subscribe their names) A.D. 1836.

Witnesses
John Eayrs
Peter Clark Jr.

James C. Chaunel

Ex'd
M.P.H.

Drawings

[X 80 words]